United States Patent [19]

Tangler et al.

[11] Patent Number: 5,417,548
[45] Date of Patent: May 23, 1995

[54] ROOT REGION AIRFOIL FOR WIND TURBINE

[75] Inventors: James L. Tangler, Boulder, Colo.; Dan M. Somers, State College, Pa.

[73] Assignee: Midwest Research Institute, Kansas City, Mo.

[21] Appl. No.: 181,008

[22] Filed: Jan. 14, 1994

[51] Int. Cl.6 .............................. B63H 1/26
[52] U.S. Cl. ..................... 416/223 R; 416/DIG. 2; 416/DIG. 5
[58] Field of Search ....... 416/223 R, DIG. 2, DIG. 5

[56] References Cited

U.S. PATENT DOCUMENTS

| | | | |
|---|---|---|---|
| 4,240,598 | 12/1980 | Espin et al. | 416/223 R |
| 4,412,664 | 11/1983 | Noonan | 416/223 R |
| 4,416,434 | 11/1983 | Thibert et al. | 416/223 R |
| 4,630,787 | 12/1986 | Middlebrook | 416/223 R |
| 4,652,213 | 3/1987 | Thibert et al. | 416/223 R |
| 4,668,169 | 5/1987 | Perry | 416/223 R |
| 5,209,643 | 5/1993 | Cole | 416/DIG. 5 |

Primary Examiner—John T. Kwon
Attorney, Agent, or Firm—Edna M. O'Connor

[57] ABSTRACT

A thick airfoil for the root region of the blade of a wind turbine. The airfoil has a thickness in a range from 24%–26% and a Reynolds number in a range from 1,000,000 to 1,800,000. The airfoil has a maximum lift coefficient of 1.4–1.6 that has minimum sensitivity to roughness effects.

19 Claims, 1 Drawing Sheet

ROOT REGION AIRFOIL FOR WIND TURBINE

CONTRACTUAL ORIGIN OF THE INVENTION

The United States Government has rights in this invention under Contract No. DE-AC0283CH10093 between the U.S. Department of Energy and the National Renewable Energy Laboratory, a Division of Midwest Research Institute.

BACKGROUND OF THE INVENTION

This invention relates to the field of wind turbines and specifically to an airfoil for use in the blade of such a turbine.

In the past, conventional aircraft airfoil designs have been used in wind turbines. Such aircraft airfoil designs have created problems with the turbines. For clean blade conditions, these airfoils result in excessive power in high winds (which leads to burned out generators). Another problem with such conventional aircraft airfoils, which is specifically addressed by the instant invention, occurs when the blades produce inadequate energy output due to the blades becoming soiled with insect accumulation and airborne pollutants. The soiling of the blades creates airfoil roughness which affects the airfoil maximum lift coefficient and the desired power output. In aircraft, such roughness is not of major concent since aircraft typically fly in clean air at high altitudes and because of scheduled cleaning of the planes. But in wind turbines such cleaning is expensive and often difficult.

In the past, airfoils for wind turbine blades have been very susceptible to the effects of roughness. The instant invention is concerned with all improved thick airfoil for the root section of the blade of a horizontal-axis wind turbine, wherein the airfoil's maximum lift coefficient has minimum sensitivity to leading edge roughness effects.

An airfoil for file rotor blades of wind turbines is disclosed in U.S. Pat. No. 4,732,542 to Hahn et al. The patent, however, is directed to particular construction techniques, and not to an aeronautical design to minimize roughness effects.

Two airfoils for turboprop aircraft are disclosed in U.S. Pat. No. 4,941,803 and 4,830,574 to Wainauski et al. There are several distinctions between the airfoil of the instant invention and the Wainauski et al. patents. Notably, the patent contemplates the use of much smaller blades in a prop fan. Also, the airfoils of the patent are generally thinner with a thickness range of only 2% to 20% along the blade. The airfoils of the patents were designed for high Mach numbers and high blade solidity. Also, the maximum lift coefficients for the Wainauski et al. patents were not designed to be insensitive to roughness effects. Both patents, also, discuss foreign body damage, but not roughness sensitivity. Thus they are more concerned with damage of the leading edge, rather than the accumulation of insects and airborne contaminants. Again, cleaning processes associated with aircraft and operation in clean air minimize roughness concerns, whereas such cleaning is expensive, and surface contamination prior to cleaning effect total energy output for wind turbines.

U.S. Pat. No. 4,606,519 to Fertis et at. is directed to an airfoil having an offset in the upper surface. The airfoil is so designed to improve the lift and stall characteristics of the wing at high, cruising airspeeds without substantially increasing the drag. Minimizing roughness sensitivity is not a concern of the patent. The instant invention, furthermore, contemplates a smooth suction surface without the discreet step or offset feature of the patent.

Roughness concerns are also not discussed in U.S. Pat. No. 4,459,083 to Bingham. This patent is specifically directed to airfoils for rotor-type aircraft and as such is directed to a thinner type of blade. The airfoil of this patent is also designed to reduce compressibility effects and provide a high drag divergence Mach number. The airfoils of rite instant invention, in contrast, were not designed to have either of these features.

Laminar flow over an airfoil is the concern of U.S. Pat. No. 4,619,423 to Holmes et al. Specifically, the patent is concerned with shaping the interface mechanism at the juncture of the leading edge structure with both the upper and lower main wing skin panels, to allow laminar flow to occur over both the upper and lower surfaces of the airfoil. Thus, the patent uses passive geometric interface devices to help maintain laminar flow over a discontinuity in the airfoil surface. However, maintaining laminar flow by shaping an interface mechanism is not a concern nor a design requirement for the airfoil of the instant invention.

The airfoil of U.S. Pat. No. 4,830,315 has a relatively thin trailing edge with a series of troughs and ridges to form wave-like surface undulations. Again, the patent to Presy, Jr. et al. is not concerned with roughness created by insects and airborne contaminants. It is further noted that roughness is generally more pronounced on the leading edge of the airfoil, whereas the patent is concerned with trailing edge geometry to delay boundary layer separation without creating a noticeable drag penalty.

A nonsmooth surface shape is disclosed in U.S. Pat. No. 5,114,099 to Gao. In contrast, the surface of instant invention is of the conventional, generally smooth type. The surface shape of the patent attempts to reduce drag. Roughness and its effects are not the concern of the patent.

In summary, none of the above cited patents specifically deal with an airfoil design to minimize roughness sensitivity, except for U.S. Pat. No. 4,619,423. That patent, however, is concerned with an interface mechanism to help maintain laminar flow over the airfoil surface.

SUMMARY OF THE INVENTION

It is an object of the instant invention to provide a high performance airfoil with minimum roughness sensitivity.

It is a further object of the invention to provide a wind turbine blade airfoil with a high maximum lift coefficient that has minimal sensitivity to roughness effects.

It is an additional object of the invention to provide a thick root airfoil that minimizes energy losses even when the blades become soiled with insect accumulation or airborne contaminants.

It is a further object of the invention to provide an airfoil which decreases blade cleaning requirements and thus minimizes energy production losses.

It is a further object of the invention to provide an airfoil that has a high lift to drag ratio which occurs close to the maximum lift coefficient.

The primary goal of new wind turbine blade designs is to convert the kinetic energy in the wind into mechanical energy as inexpensively and efficiently as possible. Any rotor efficiency loss due to roughness effect the total energy output, and cleaning the large-sized wind turbine blades to minimize roughness can be expensive to perform.

The blades of horizontal-axis wind turbines typically become coated with insect accumulations and airborne contaminants. This collection of dirt, called roughness, predominantly happens at the leading edge of the blade. The roughness interrupts the efficient operation of the blades, and diminishes their overall performance.

The instant invention is directed to a thick airfoil for the root region of the blade and is designed to have a maximum lift coefficient that is less sensitive to roughness effects.

The airfoils range from 24%–26% thickness, with thickness being defined by the airfoil depth perpendicular to the chord line divided by the chord line length, and are used in a blade having a length from 5 to 15 meters. The airfoils are designed with a Reynolds number in the range from 1,000,000 to 1,800,000, with a maximum lift coefficient of 1.4 to 1.6. The airfoils are specifically designed for the root region of a wind turbine blade though the design can also be extended into the mid-span section.

DETAILED DESCRIPTION OF THE PREFERRED EMBODIMENT

Figure 1:
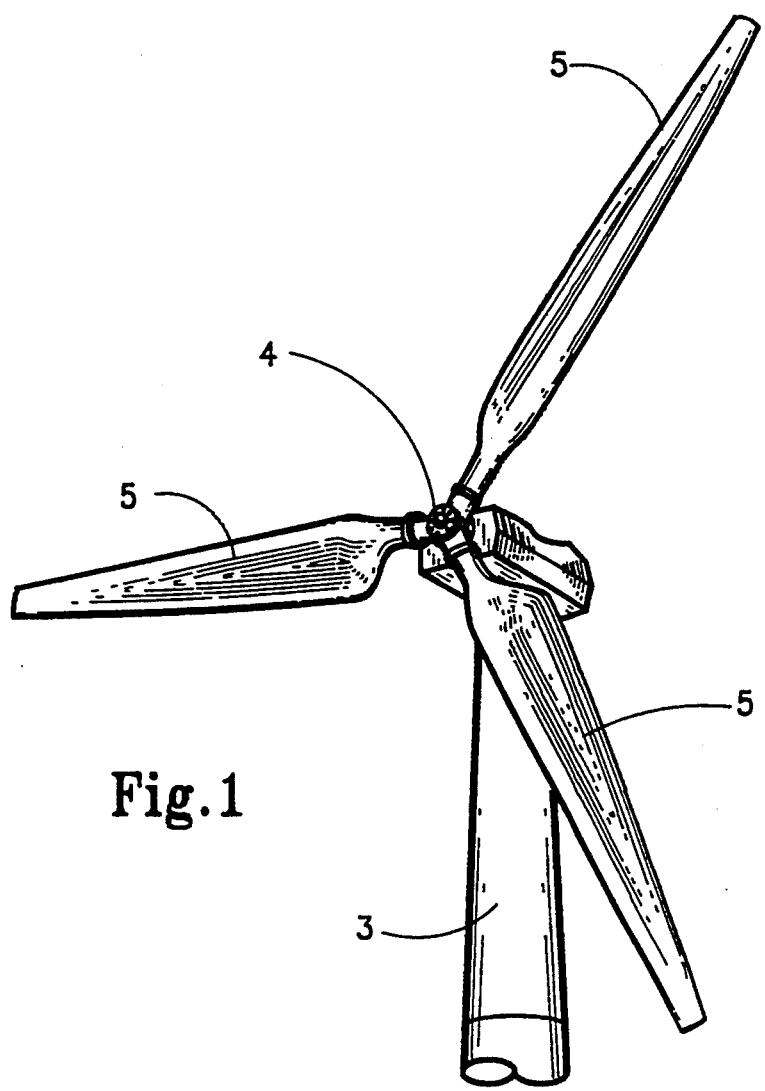
FIG. 1 is a perspective of a horizontal-axis wind turbine that can incorporate the instant invention.

FIG. 1 shows a typical stall-regulated horizontal-axis wind turbine. Blades 5 rotate about center axis shaft 4 having a center horizontal-axis of rotation, and the entire rotor mechanism is supported by support tower 3.

The instant invention is particularly concerned with blades of the thick-airfoil family. Such blades have slightly more drag than thin-airfoil blades and are typically made of either fiberglass or wood composite. The blades range in size from 5 to 15 meters to form a rotor which can be as large as 30 meters in diameter.

Airfoils typically have performance characteristics that are tailored to change from the blade tip (95% radius from the center of rotation), to the blade root (up to 50% radius from the center of rotation). The instant invention is primarily concerned with the region from 20% to 50% from the center of rotation. Thus, the thick-airfoils of the invention are primarily root region airfoils.

An airfoil in the root region of the blade must have a high maximum lift coefficient and a high lift-to-drag ratio close to the maximum lift coefficient to aid rotor start-up and energy production at medium wind speeds. The airfoils of the instant invention are incorporated in a blade whose maximum lift coefficient increases in a continuous manner from blade tip to blade root for effective peak power control. This results in a 15% greater swept disc area for a given generator size and results in increased energy production.

The root-airfoils of the present invention are designed to have the maximum lift coefficient be less sensitive to roughness effects. To achieve roughness insensitivity, the airfoil's shape is geometrically tailored to induce a transition from laminar to turbulent flow near the leading edge of the airfoil as the maximum lift coefficient is approached.

Figure 2:
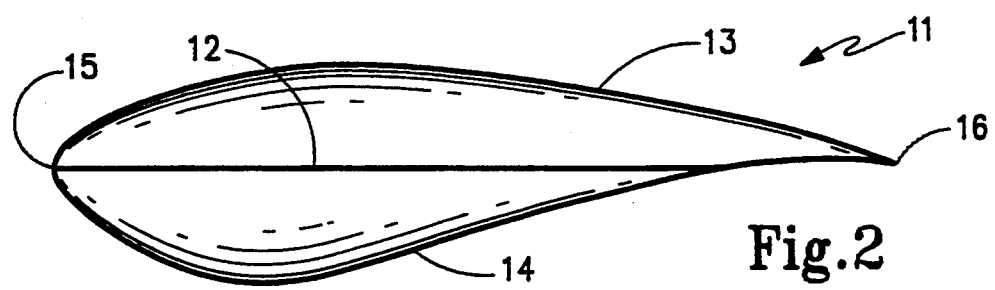
FIG. 2 is a profile of an airfoil in accordance with the instant invention.

FIG. 2 is a profile of an airfoil in accordance with the instant invention. The airfoil has specific geometric tailoring to achieve a Reynolds number of 1,500,000 with a maximum lift coefficient of 1.4 to 1.6. This maximum lift coefficient will be largely insensitive to roughness effects. The minimum drag coefficient is approximately 0.010.

The upper surface of the airfoil is shown at 13 and the lower surface at 14. The leading edge is at 15 and the trailing edge at 16. The airfoil has a thickness of 24%.

The specific shape of the airfoil 11 of FIG. 2 are given in the form of the following table of coordinates. The x/c values are dimensionless locations on the blade chord line 12. They are given for both the upper and lower surfaces. The y/c values are the dimensionless heights from the chord line 12 to points either on the upper or lower surface.

| Upper Surface | | Lower Surface | |
|---|---|---|---|
| x/c | y/c | x/c | y/c |
| 0.00116 | 0.00703 | 0.00048 | −0.00470 |
| .00830 | .01892 | .00607 | −.01746 |
| .02064 | .03130 | .01644 | −.03159 |
| .03771 | .04378 | .03097 | −.04646 |
| .05918 | .05608 | .04923 | −.06162 |
| .08475 | .06791 | .07077 | −.07662 |
| .11409 | .07903 | .09515 | −.09096 |
| .14685 | .08921 | .12193 | −.10412 |
| .18266 | .09821 | .15072 | −.11545 |
| .22111 | .10580 | .18122 | −.12425 |
| .26177 | .11175 | .21322 | −.12971 |
| .30418 | .11564 | .24712 | −.13079 |
| .34829 | .11696 | .28389 | −.12736 |
| .39439 | .11573 | .32394 | −.11990 |
| .44237 | .11251 | .36753 | −.10887 |
| .49169 | .10775 | .41483 | −.09511 |
| .54177 | .10173 | .46552 | −.07962 |
| .59199 | .09473 | .51909 | −.06328 |
| .64174 | .08698 | .57485 | −.04703 |
| .69037 | .07873 | .63189 | −.03173 |
| .73723 | .07016 | .68912 | −.01818 |
| .78169 | .06146 | .74529 | −.00701 |
| .82312 | .05276 | .79901 | .00134 |
| .86095 | .04417 | .84887 | .00671 |
| .89460 | .03567 | .89348 | .00917 |
| .92380 | .02706 | .93154 | .00910 |
| .94879 | .01848 | .96197 | .00701 |
| .96963 | .01071 | .98364 | .00377 |
| .98582 | .00470 | .99606 | .00102 |
| .99632 | .00112 | 1.00000 | .00000 |
| 1.00000 | .00000 | | |

Figure 3:
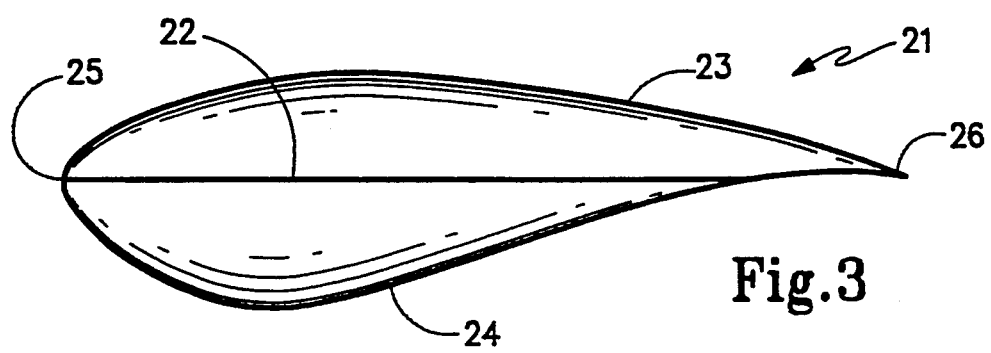
FIG. 3 is a profile of another airfoil in accordance with the instant invention.

FIG. 3 is a profile of another airfoil in accordance with the instant invention. The airfoil has specific geometric tailoring to achieve a Reynolds number of 1,200,000 with a maximum lift coefficient of 1.4 to 1.5. This maximum lift coefficient will be largely insensitive to roughness effects. The minimum drag coefficient is approximately 0.011.

The upper surface of the airfoil is shown at 23 and the lower surface at 24. The leading edge is at 25 and the trailing edge at 26. The airfoil has a thickness of 26%.

The specific shape of the airfoil 21 of FIG. 3 are also given in the form of the following table of coordinates. The x/c values are dimensionless locations on the blade chord line 22. They are given for both the upper and lower surfaces. The y/c values are the dimensionless heights from the chord line 22 to points either on the upper or lower surface.

| Upper Surface | | Lower Surface | |
|---|---|---|---|
| x/c | y/c | x/c | y/c |
| 0.00057 | 0.00537 | 0.00110 | −0.00764 |
| .00658 | .01777 | .00741 | −.02242 |
| .01821 | .03072 | .01808 | −.03839 |
| .03475 | .04381 | .03268 | −.05497 |
| .05579 | .05671 | .05083 | −.07167 |
| .08099 | .06913 | .07213 | −.08804 |
| .11003 | .08082 | .09618 | −.10358 |
| .14253 | .09152 | .12257 | −.11776 |
| .17811 | .10101 | .15092 | −.12995 |
| .21637 | .10902 | .18094 | −.13947 |
| .25688 | .11531 | .21239 | −.14548 |
| .29916 | .11947 | .24569 | −.14690 |
| .34317 | .12093 | .28191 | −.14360 |
| .38927 | .11972 | .32148 | −.13627 |
| .43735 | .11645 | .36439 | −.12537 |
| .48685 | .11157 | .41069 | −.11151 |
| .53719 | .10540 | .46020 | −.09549 |
| .58773 | .09821 | .51257 | −.07811 |
| .63784 | .09024 | .56728 | −.06032 |
| .68686 | .08175 | .62362 | −.04304 |
| .73414 | .07294 | .68061 | −.02724 |
| .77902 | .06397 | .73706 | −.01371 |
| .82087 | .05500 | .79160 | −.00312 |
| .85909 | .04613 | .84270 | .00417 |
| .89307 | .03733 | .88881 | .00809 |
| .92258 | .02838 | .92844 | .00894 |
| .94785 | .01943 | .96029 | .00725 |
| .96899 | .01127 | .98298 | .00400 |
| .98548 | .00495 | .99592 | .00109 |
| .99623 | .00118 | 1.00000 | .00000 |
| 1.00000 | .00000 | | |

The airfoils of the instant invention are part of a family of airfoils which encompass root airfoils in a range from 24%-26% thickness, with a Reynolds number in the range from 1,000,000 to 1,800,000, with a maximum lift coefficient of 1.4 to 1.6. They were specifically designed for fixed-pitch stall-regulated horizontal-axis wind turbines, but it is contemplated that they can be used with variable-pitch or variable-speed wind turbines.

Also, although the airfoils were specifically designed to reduce roughness sensitivity, it is contemplated the effects of erosion 10 to 30 thousandths of an inch can also have a reduced effect with the airfoils of the instant invention.

Although the invention has been shown and described with respect to a preferred embodiment, it should be understood by those skilled in the art that various changes, omissions, and additions in the form and detail thereof may be made therein without departing from the spirit and scope of the claimed invention.

We claim:

1. An airfoil comprising:
a leading edge,
a trailing edge spaced from said leading edge,
an upper surface extending from said leading edge to said trailing edge,
a lower surface extending from said leading edge to said trailing edge,
said airfoil having a cross-sectional shape characterized by a thickness in a range from 24%-26%,
a Reynolds number in a range from 1,000,000–1,800,000,
and a maximum lift coefficient in a range from 1.4–1.6.

2. The airfoil of claim 1 wherein the airfoil is a root region airfoil.

3. The airfoil of claim 1 wherein said thickness is 24%, and said Reynolds number is 1,500,000.

4. The airfoil of claim 1 wherein said thickness is 26%, and said Reynolds number is 1,200,000.

5. An airfoil for the root region of a blade of a wind turbine said airfoil having a thickness in the range from 24%–26%, and a maximum lift coefficient of 1.4–1.6.

6. The airfoil of claim 5 wherein the Reynolds number is in a range from 1,000,000–1,800,000.

7. The airfoil of claim 6 wherein said thickness is 24% and said Reynolds number is 1,500,000.

8. The airfoil of claim 6 wherein said thickness is 26% and said Reynolds number is 1.200,000.

9. A blade for a wind turbine comprising
a family of root region airfoils,
each airfoil of said family having a thickness in a range from 24%–26%, a Reynolds number in a range from 1,000,000–1,800,000 and a maximum lift coefficient in a range from 1.4 to 1.6.

10. The blade of claim 9 wherein at least one of said airfoils has a thickness of 24% and a Reynolds number of 1,500,000.

11. The blade of claim 10 wherein at least another of said airfoils has a thickness of 26% and a Reynolds number of 1,200,000.

12. The blade of claim 9 wherein at least one of said airfoils has a thickness of 26% and a Reynolds number of 1,200,000.

13. In a wind turbine having a horizontal axis around a center of rotation, said wind turbine comprising
at least one blade mounted for rotation on said horizontal axis about said center of rotation,
said blade comprising a root region extending up to 50% radius from the center of rotation,
at least one airfoil in said root region of said blade,
said airfoil having a thickness in a range from 24%–26%, a Reynolds number in a range from 1,000,000 to 1,800,000, and a maximum lift coefficient designed to minimize roughness effects.

14. The wind turbine of claim 13 wherein said maximum lift coefficient is in a range from 1.4 to 1.6.

15. The wind turbine of claim 14 wherein said airfoil has a thickness of 24% and a Reynolds number of 1,500,000.

16. The wind turbine of claim 14 wherein said airfoil has a thickness of 26% and a Reynolds number of 1,200,000.

17. The wind turbine of claim 14 comprising a family of airfoils in said root region and wherein one of said airfoils of said family has a thickness of 26% and a Reynolds number of 1,200,000; and wherein another airfoil of said family has a thickness of 24% and a Reynolds number of 1,500,000.

18. An airfoil for the root region of an airfoil blade, said airfoil comprising an upper surface and a lower surface and a blade chord line wherein x/c values are dimensionless locations on the blade chord line and the y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00116 | 0.00703 | 0.00048 | −0.00470 |
| .00830 | .01892 | .00607 | −.01746 |
| .02064 | .03130 | .01644 | −.03159 |

-continued

| Upper Surface | | Lower Surface | |
|---|---|---|---|
| x/c | y/c | x/c | y/c |
| .03771 | .04378 | .03097 | −.04646 |
| .05918 | .05608 | .04923 | −.06162 |
| .08475 | .06791 | .07077 | −.07662 |
| .11409 | .07903 | .09515 | −.09096 |
| .14685 | .08921 | .12193 | −.10412 |
| .18266 | .09821 | .15072 | −.11545 |
| .22111 | .10580 | .18122 | −.12425 |
| .26177 | .11175 | .21322 | −.12971 |
| .30418 | .11564 | .24712 | −.13079 |
| .34829 | .11696 | .28389 | −.12736 |
| .39439 | .11573 | .32394 | −.11990 |
| .44237 | .11251 | .36753 | −.10887 |
| .49169 | .10775 | .41483 | −.09511 |
| .54177 | .10173 | .46552 | −.07962 |
| .59199 | .09473 | .51909 | −.06328 |
| .64174 | .08698 | .57485 | −.04703 |
| .69037 | .07873 | .63189 | −.03173 |
| .73723 | .07016 | .68912 | −.01818 |
| .78169 | .06146 | .74529 | −.00701 |
| .82312 | .05276 | .79901 | .00134 |
| .86095 | .04417 | .84887 | .00671 |
| .89460 | .03567 | .89348 | .00917 |
| .92380 | .02706 | .93154 | .00910 |
| .94879 | .01848 | .96197 | .00701 |
| .96963 | .01071 | .98364 | .00377 |
| .98582 | .00470 | .99606 | .00102 |
| .99632 | .00112 | 1.00000 | .00000 |
| 1.00000 | .00000 | | |

19. An airfoil for the root region of an airfoil blade, said airfoil comprising an upper surface and a lower surface and a blade chord line wherein x/c values are dimensionless locations on the blade chord line and the y/c values are dimensionless heights from the chord line to points on the upper or lower surface, wherein said values correspond substantially to the following table for said surfaces:

| Upper Surface | | Lower Surface | |
|---|---|---|---|
| x/c | y/c | x/c | y/c |
| 0.00057 | 0.00537 | 0.00110 | −0.00764 |
| .00658 | .01777 | .00741 | −.02242 |
| .01821 | .03072 | .01808 | −.03839 |
| .03475 | .04381 | .03268 | −.05497 |
| .05579 | .05671 | .05083 | −.07167 |
| .08099 | .06913 | .07213 | −.08804 |
| .11003 | .08082 | .09618 | −.10358 |
| .14253 | .09152 | .12257 | −.11776 |
| .17811 | .10101 | .15092 | −.12995 |
| .21637 | .10902 | .18094 | −.13947 |
| .25688 | .11531 | .21239 | −.14548 |
| .29916 | .11947 | .24569 | −.14690 |
| .34317 | .12093 | .28191 | −.14360 |
| .38927 | .11972 | .32148 | −.13627 |
| .43735 | .11645 | .36439 | −.12537 |
| .48685 | .11157 | .41069 | −.11151 |
| .53719 | .10540 | .46020 | −.09549 |
| .58773 | .09821 | .51257 | −.07811 |
| .63784 | .09024 | .56728 | −.06032 |
| .68686 | .08175 | .62362 | −.04304 |
| .73414 | .07294 | .68061 | −.02724 |
| .77902 | .06397 | .73706 | −.01371 |
| .82087 | .05500 | .79160 | −.00312 |
| .85909 | .04613 | .84270 | .00417 |
| .89307 | .03733 | .88881 | .00809 |
| .92258 | .02838 | .92844 | .00894 |
| .94785 | .01943 | .96029 | .00725 |
| .96899 | .01127 | .98298 | .00400 |
| .98548 | .00495 | .99592 | .00109 |
| .99623 | .00118 | 1.00000 | .00000 |
| 1.00000 | .00000 | | |

* * * * *